United States Patent [19]

Watanabe et al.

[11] Patent Number: 4,922,972
[45] Date of Patent: May 8, 1990

[54] METHOD OF FILLING A LIQUID CRYSTAL DEVICE WITH LIQUID CRYSTAL

[75] Inventors: Toshio Watanabe; Akio Osabe; Akira Mase, all of Atsugi; Hiroyuki Sakayori, Machida; Masahiko Sato, Atsugi; Kaoru Tabata, Atsugi, all of Japan

[73] Assignee: Semiconductor Energy Laboratory Co., Ltd., Kanagawa, Japan

[21] Appl. No.: 174,401

[22] Filed: Mar. 25, 1988

[30] Foreign Application Priority Data

Mar. 26, 1987 [JP] Japan .................................. 62-73413
Mar. 26, 1987 [JP] Japan .................................. 62-73414

[51] Int. Cl.$^5$ ............................ B67D 5/37; G02F 9/00
[52] U.S. Cl. .......................................... 141/4; 141/1; 141/5; 141/7; 141/11; 141/12; 141/59; 141/71; 141/82
[58] Field of Search ...................... 141/1, 4, 5, 7, 8, 9, 141/11, 12, 59, 65, 69, 71, 73, 80, 82; 156/99, 148, 145, 103–105

[56] References Cited

U.S. PATENT DOCUMENTS

| 3,701,368 | 10/1972 | Stern | 141/1 |
| 4,064,919 | 12/1977 | Stern et al. | 141/7 |
| 4,091,847 | 5/1978 | Sorkin | 141/7 |
| 4,098,301 | 7/1978 | Bloom et al. | 141/7 |
| 4,626,303 | 12/1986 | Ogura | 156/145 |
| 4,753,276 | 6/1988 | Inaba et al. | 141/7 |

FOREIGN PATENT DOCUMENTS

| 0007015 | 1/1977 | Japan | 141/7 |
| 0168627 | 12/1981 | Japan | 141/1 |
| 0168633 | 12/1981 | Japan | 141/1 |
| 62-34129 | 2/1987 | Japan | |

*Primary Examiner*—Ernest G. Cusick
*Attorney, Agent, or Firm*—Sixbey, Friedman, Leedom & Ferguson

[57] ABSTRACT

A method of filling a liquid crystal device including a pair of parallel substrates having external surfaces with a liquid crystal material is set forth. The liquid crystal device is filled by disposing the liquid crystal device in a vacuum chamber between a pair of opposed parallel plates, evacuating the vacuum chamber, supplying the liquid crystal material to an inlet of the device, elevating the pressure in the chamber to allow the liquid crystal material to enter a space formed between the parallel substrates through the inlet by virtue of a differential pressure between the inside and the outside of the liquid crystal device, and applying opposed pressure with the parallel plates to the external surfaces of the parallel substrates respectively in order to form a uniform liquid crystal device. With the external pressure being applied to compensate for the expansion of the liquid crystal device during the elevation of the pressure within the vacuum chamber.

6 Claims, 3 Drawing Sheets

| ×2.1 | ×2.0 | ×2.1 |
|------|------|------|
| ×2.1 | ×2.0 | ×2.1 |
| ×2.1 | ×2.0 | ×2.1 |
| ×2.1 | ×2.0 | ×2.1 |

| ×2.2 | ×2.5 | ×2.2 |
|------|------|------|
| ×2.3 | ×3.5 | ×2.3 |
| ×2.3 | ×3.6 | ×2.3 |
| ×2.2 | ×2.5 | ×2.2 |

| ×2.1 | ×2.0 | ×2.1 |
|------|------|------|
| ×2.1 | ×2.0 | ×2.1 |
| ×2.1 | ×2.0 | ×2.1 |
| ×2.1 | ×2.0 | ×2.1 |

METHOD OF FILLING A LIQUID CRYSTAL DEVICE WITH LIQUID CRYSTAL

BACKGROUND OF THE INVENTION

This invention relates to a method of filling a liquid crystal device with a liquid crystal.

Vacuum filling method is a known method for filling a space between a pair of substrates with a liquid crystal to manufacture a liquid crystal device. In this prior art method, the liquid crystal device is disposed together with the liquid crystal in a vaccum chamber at a vacuum, and then, after the inlet of the device is dipped in the liquid crystal, the pressure is elevated so that the liquid crystal enters the liquid crystal device. One type of this method is described in Japanese application No. sho 60-175192.

However, there are several shortcomings associated with this method. The inlet of the liquid crystal device is somewhat narrow so that the pressure in the liquid crystal device can not be lowered rapidly. Because of this, the liquid crystal device is subjected to the differential pressure between the inside and the outside of the liquid crystal device when the vacuum chamber is evacuated, and therefore tend to be deformed due to the undesirable pressure.

To comply with the shortcoming, it is proposed to mate a pair of substrates firmly to bear the differential pressure and maintain the distance between substrates with two or more types of spacers arranged therein. Nevertheless, in some instances the device may be destroyed due to a transient force of about 1 kg.cm$^2$ which arises during evacuation.

Furthermore, the filling process is generally carried out in a particular phase of liquid crystal. A ferroelectric liquid crystal exhibits its phase transition as the temperature varies, e.g. Cry phase ⟷ Smc phase ⟷ SmA phase ⟷ Iso phase. The phase transition is observed also with a blended liquid crystal. An Iso (isotropic) phase is suitable for the filling process because of its low viscosity. An example of the method is described in Japanese Patent Application No. sho 60-175192.

However, when a blended liquid crystal material composed of several constituent liquid crystals is used, a particular liquid crystal of the constituents tends to enter first so that the liquid crystal material having entered into the device becomes different from the prescribed composition. Having carefully investigated the phenomena, the inventors found that the transition temperature of the blended liquid crystal is not observed clear at a certain defenite temperature and a mixed phase seems to appear between the constituents due to differential transition temperatures of the constituent liquid crystals. In other word, it may happen during filling process that a constituent liquid crystal is of Iso phase while another constituent liquid crystal remains in Smc phase.

SUMMARY OF THE INVENTION

It is therefore an object of the invention to provide a method of filling a liquid crystal device with liquid crystal.

It is another object of the invention to provide a method of filling a liquid crystal device with liquid crystal in which the yield of product is not lowered due to the process.

It is a further object of the invention to provide a method of filling a liquid crystal device with liquid crystal without deforming the device by the filling process.

BRIEF DESCRIPTION OF THE DRAWINGS

FIGS. 3(A), 3(B) and 3(C) are explanatory views showing the distance between parallel substrates of a liquid crystal device, in which measured points are given marks x and the measurement results are written below the marks.

DETAILED DESCRIPTION OF THE PREFERRED EMBODIMENTS

Figure 1:
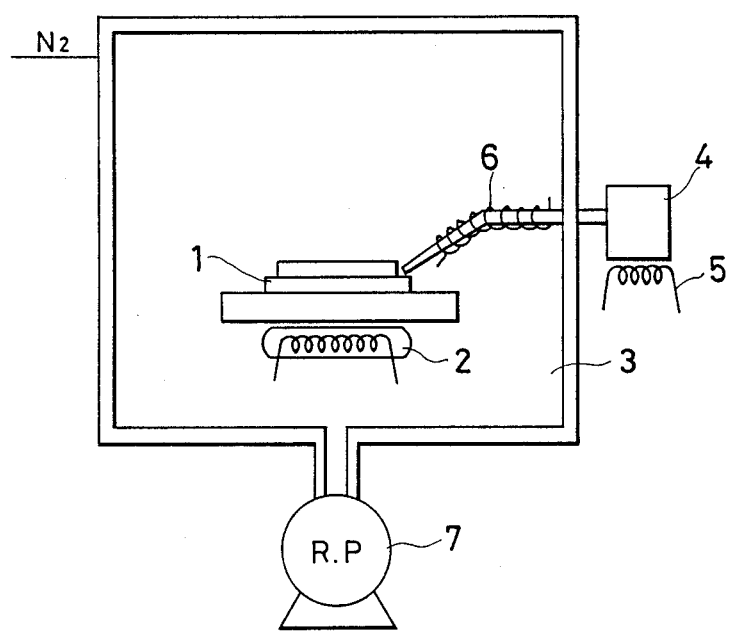
FIG. 1 is a schematic view showing a method of filling a liquid crystal device with a liquid crystal in accordance with the present invention.

Referring to FIG. 1, a method of filling a liquid crystal device with a liquid crystal in accordance with the present invention will be explained. The liquid crytal device comprises a pair of glass substrates which are firmly arranged in parallel and spaced a certain distance to produce a space in between.

In FIG. 1, a liquid crystal device 1 is placed in a vacuum chamber 3 whose pressure is maintained at $1 \times 10^{-4}$ Torr or higher by a vacuum pump 7 while the liquid crystal device 1 is heated by a heater 2. On the other hand, a dispenser 4 accommodating a liquid crystal therein is heated by a heater 5 above the transition temperature so that the liquid crystal is maintained in the Iso phase. The liquid crystal is a blended liquid crystal composed of two or more constituent liquid crystals. An amount of the liquid crystal is poured to the inlet of the liquid crystal device. In this process, the temperature of the liquid crystal is always maintained higher than the transition temperature of any constituent liquid crystal by the heaters 2, 4 and 6.

Then, nitrogen gas is introduced at 20SCCM to the inside of the vacuum chamber 3 to produce a differential pressure between the outside and the inside of the liquid crystal device whereupon the liquid crystal in Iso phase is forced to enter the device under the pressure. The pressure in the chamber is eventually elevated to an atmospheric pressure.

Figure 2:
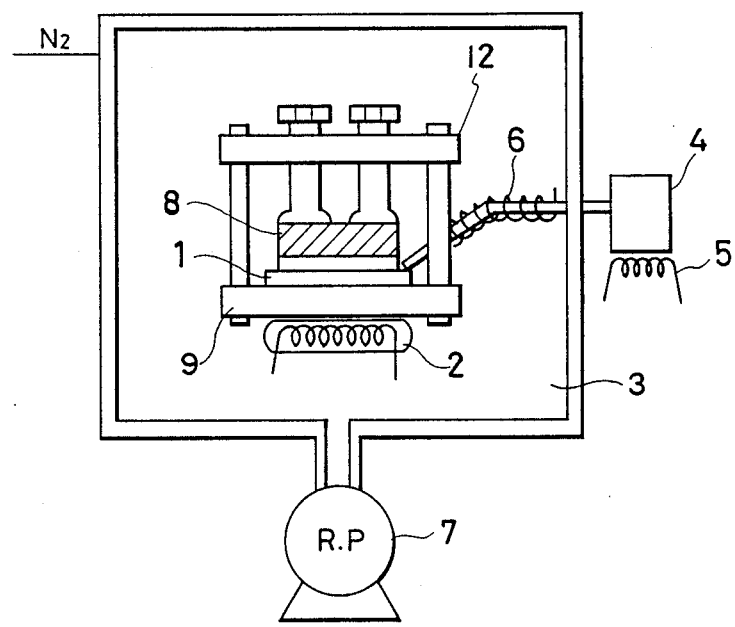
FIG. 2 is a schematic view showing another method of filling a liquid crystal device with a liquid crystal in accordance with the present invention.

FIG. 2 is a schematic view showing a second embodiment of a method in accordance with the present invention.

In FIG. 2, like numbers are given to corresponding parts to the first embodiment and the redundant explanation is dispensed with. The liquid crystal device 1 comprising a pair of substrates with spacers inbetween is disposed between parallel plates 8 and 9 of a press 12. The attitudes of the plates are precisely in parallel. During filling of liquid crystal, the liquid crystal device is pressed in the vertical direction by means of the parallel plates 8 and 9 at 1 Kg/cm$^2$. The pressure should be determined in accordance with the evacuation level, e.g. 0.5-5.0 Kg/cm$^2$.

After filling the liquid crystal device with liquid crystal, the distance between the substrates of the device was measured at several points. FIGS. 3(A), 3(B) and 3(C) are explanatory views in which measured points are given marks x and the measurement results are written below the marks in micrometers. FIG. 3(A) shows the result of measurement prior to filling. FIG. 3(B)

shows the result after filling in accordance with prior art. As shown in the figure, the disparity of distance was enlarged by the prior art filling process. FIG. 3(C) shows the result after filling in accordance with the present invention. With the precise experimental measurements, there was no appliciable change between after and before the filling process.

While a description has been made for several embodiments, the present invention should be limited only by the appended claims and should not be limited by the particular examples. What follow are some examples of modifications and variation according to the invention.

We claim:

1. A method of filling a liquid crystal device including a pair of parallel substrates having external surfaces with a liquid crystal material comprising:

disposing said liquid crystal device in a vacuum chamber between a pair of opposed parallel plates;

evacuating said vacuum chamber;

supplying said liquid crystal material to an inlet of said device;

elevating the pressure in said chamber to allow said liquid crystal material to enter a space formed between said parallel substrates through said inlet by virtue of the differential pressure between the inside and the outside of said liquid crystal device; and applying opposed pressure with said parallel plates to said external surfaces of said parallel substrates respectively in order to form a uniform liquid crystal device.

2. The method of claim 1 wherein said vacuum chamber is evacuated to $1 \times 10^{-4}$ Torr or higher.

3. The method of claim 2 wherein said opposed pressure is applied to said substrates at 0.5–5.0 $Kg/cm^2$.

4. The method of claim 1, wherein said liquid crystal material is a blended liquid crystal material.

5. The method of claim 1, further comprising the step of elevating the temperature of said liquid crystal material to an isotropic phase.

6. The method of claim 1 wherein said liquid crystal device is provided with spacers between said substrates.

* * * * *